(12) United States Patent
Kataoka et al.

(10) Patent No.: US 6,988,477 B2
(45) Date of Patent: Jan. 24, 2006

(54) CONTROL APPARATUS FOR AN INTERNAL COMBUSTION ENGINE AND CONTROL METHOD THEREOF

(75) Inventors: Kenji Kataoka, Susono (JP); Kimitoshi Tsuji, Susono (JP); Yasushi Kusaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/459,455

(22) Filed: Jun. 12, 2003

(65) Prior Publication Data

US 2004/0000282 A1    Jan. 1, 2004

(30) Foreign Application Priority Data

Jul. 1, 2002    (JP) .............................. 2002-192464

(51) Int. Cl.
*F01L 13/08*    (2006.01)

(52) U.S. Cl. .............................. 123/182.1; 123/73 AF; 123/179.18; 123/316; 123/317; 123/532

(58) Field of Classification Search ........... 123/179.18, 123/182.1, 73 AF, 316, 317, 532, 179.21
See application file for complete search history.

(56) References Cited

U.S. PATENT DOCUMENTS

| | | | |
|---|---|---|---|
| 4,538,569 A | 9/1985 | Sugino et al. ................. | 123/6 |
| 6,234,145 B1 * | 5/2001 | Shomura ............... | 123/406.24 |
| 6,276,097 B1 * | 8/2001 | Whitley ..................... | 52/127.2 |
| 6,543,561 B1 | 4/2003 | Pels et al. .................. | 180/65.2 |
| 6,622,690 B2 * | 9/2003 | Ando et al. .................. | 123/295 |
| 6,622,710 B2 * | 9/2003 | Hasegawa et al. .......... | 123/563 |
| 6,637,394 B2 * | 10/2003 | Marshall et al. .......... | 123/179.3 |
| 6,651,617 B2 * | 11/2003 | Sukegawa et al. .......... | 123/305 |
| 6,659,069 B2 * | 12/2003 | Shiraishi et al. ............. | 123/298 |
| 6,672,268 B2 * | 1/2004 | Ogawa et al. ........... | 123/179.3 |
| 2003/0131805 A1 | 7/2003 | Yang ........................ | 123/27 R |
| 2003/0172892 A1 | 9/2003 | Glugla et al. ............. | 123/179.5 |
| 2003/0172893 A1 * | 9/2003 | Ackemann ................ | 123/179.5 |

FOREIGN PATENT DOCUMENTS

| | | |
|---|---|---|
| CA | 2 326 570 A1 | 5/2002 |
| DE | 196 32 074 A1 | 2/1998 |
| DE | 198 14 402 A1 | 10/1999 |
| DE | 199 49 931 A1 | 4/2001 |
| DE | 101 22 775 A1 | 11/2001 |
| DE | 103 07 549 A1 | 10/2003 |
| DE | 102 58 872 A1 | 7/2004 |
| EP | 1 136 696 A1 | 9/2001 |
| JP | 2000-064874 | 2/2000 |
| JP | A 2000-257411 | 9/2000 |
| JP | A-2004-197745 | 7/2004 |
| WO | WO 01/88370 A1 | 11/2001 |

\* cited by examiner

*Primary Examiner*—Tony M. Argenbright
*Assistant Examiner*—Johnny H. Hoang
(74) *Attorney, Agent, or Firm*—Oliff & Berridge, PLC

(57) ABSTRACT

An engine is cranked by a motor generator at a start time of the engine. An engine ECU opens an intake valve or an exhaust valve during a compression stroke using a valve control mechanism during a period from when cranking is started until when a predetermined crank angle position (detected by a crank angle sensor) is reached, thereby reducing a compression workload.

20 Claims, 12 Drawing Sheets

60 DEGREES AT START TIME
(UNTIL FIRST PEAK)

CONTROL APPARATUS FOR AN INTERNAL COMBUSTION ENGINE AND CONTROL METHOD THEREOF

INCORPORATION BY REFERENCE

The disclosure of Japanese Patent Application No. 2002-192464 filed on Jul. 1, 2002 including the specification, drawings and abstract is incorporated herein by reference in its entirety.

BACKGROUND OF THE INVENTION

1. Field of the Invention

The invention relates to a control apparatus for an internal combustion engine. More particularly, the invention relates to a control apparatus for an internal combustion engine, which improves startability.

2. Description of the Related Art

Recently, a technology has been employed in a hybrid vehicle, an economical running vehicle, or the like, which automatically stops an engine, for example, while the vehicle stops and is in the idling state, and automatically restarts the engine when necessary, for example, at the time of take-off, whereby fuel efficiency is improved and exhaust gas is suppressed.

In a vehicle in which the engine is repeatedly stopped and started with frequency in the aforementioned manner, the internal combustion engine needs to be started smoothly with reliability. An example of a technology for enabling the internal combustion engine to start smoothly with reliability is disclosed in Japanese Patent Laid-Open Publication No. 2000-64874. In the technology disclosed in the patent publication, valve timing of an intake valve is delayed when a direct injection type engine starts, thereby reducing an effective compression ratio in a hybrid vehicle using a direct injection type engine and an electric motor. In the patent publication, it is described that the engine can be started smoothly while suppressing engine vibration, by reducing the effective compression ratio.

However, when the effective compression ratio is reduced, an output of the internal combustion engine is reduced, which makes it difficult to increase the output quickly. In the vehicle in which the engine is repeatedly stopped and started with frequency in the aforementioned manner, when the engine is started after it is stopped, for example, at the time of take-off or at the time of acceleration, a high output of the engine is often required, and accordingly, startability of the engine needs to be improved.

SUMMARY OF THE INVENTION

Accordingly, it is an object of the invention to provide a control apparatus for an internal combustion engine which can improve the startability of the engine and can increase an output of the engine quickly.

In order to solve the aforementioned problems, a control apparatus for an internal combustion engine according to the invention includes a cranking portion which performs cranking of the internal combustion engine when the engine is started; a crank angle sensor which detects a crank angle position; and a compression workload reducing portion which operates so as to reduce a compression workload of the engine during a period from when the cranking is started until when a predetermined crank angle position is reached.

Also, a control method for an internal combustion engine includes a step of starting cranking; a step of detecting a crank angle position; and a step of reducing a compression workload of the engine during a period from when the cranking is started until when a predetermined crank angle position is reached.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
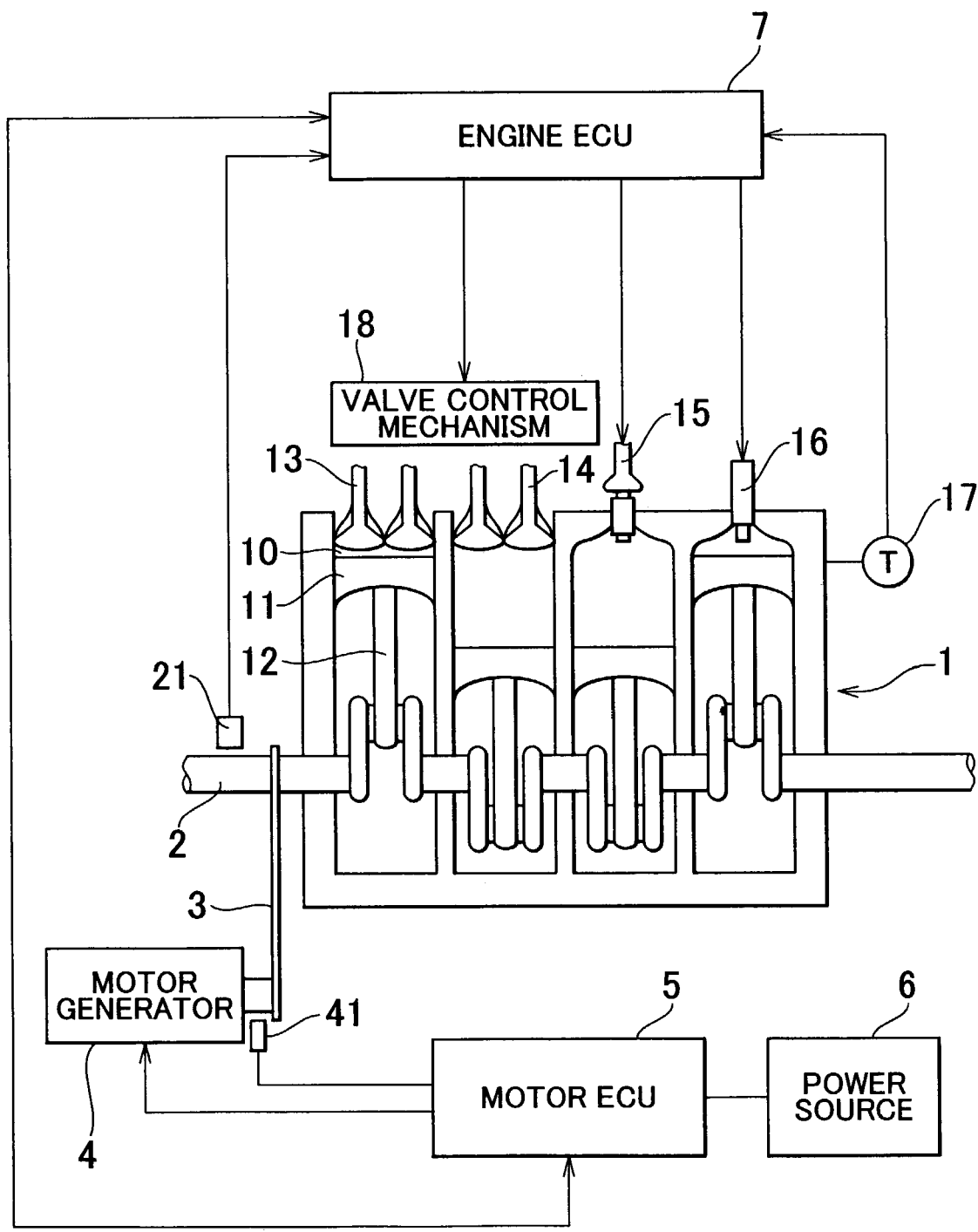
FIG. 1 is a schematic diagram showing a configuration of an internal combustion engine provided with a control apparatus for an internal combustion engine according to an embodiment of the invention.

Hereinafter, preferred embodiments of the invention will be described in detail with reference to the accompanying drawings. In order to facilitate understanding of the description, the same components in the drawings are denoted by the same reference numerals, and overlapping description thereof will be omitted.

FIG. 1 is a schematic diagram showing an internal combustion engine provided with a control apparatus for an internal combustion engine according to the invention. An engine 1 is, for example, a direct injection type four-cylinder gasoline engine. A piston 11, which reciprocates, is provided in each cylinder 10 of the engine 1. The reciprocating motion of the piston 11 is converted to rotating motion of a crank shaft 2 via a connecting rod 12. An intake valve 13, an exhaust valve 14, an ignition plug 15, and a fuel injector 16 are provided in an upper portion of each cylinder 10. Also, a valve control mechanism 18, which controls opening/closing timing and a lift amount of the intake valve 13 and the exhaust valve 14, is provided in the upper portion of each cylinder 10.

A motor generator 4, which is a cranking portion, is connected to the crank shaft 2 via speed reducing means 3 including a belt and the like. The motor generator 4 is connected to a power source 6 via a motor ECU 5. A crank angle sensor 21 for detecting a crank angle position is provided on the crank shaft 2, and a motor angle sensor 41 for detecting an angle position of a motor shaft of the motor generator 4 is provided on the motor shaft.

A speed reducing ratio of the speed reducing means 3 is set, for example, at 2.5. One rotation of the motor generator 4 is reduced to 0.4 rotation of the crank shaft 2. Detection accuracy of the crank angle sensor 21 is 10 degrees CA. Meanwhile, when a Hall element is used for the motor angle sensor 41, the detection accuracy of the motor angle sensor 41 is approximately 7.5 degrees CA, which corresponds to 3.0 degrees CA of the crank shaft 2 considering the speed reducing ratio.

A coolant temperature sensor 17 is provided in the engine 1. An output of the coolant temperature sensor 17 and outputs of the crank angle sensor 21 and the other sensors are input to the engine ECU 7 which controls the engine 1. Also, the engine ECU 7 controls operations of the valve control mechanism 18, the ignition plug 15, and the fuel injector 16.

A motor angle sensor 41 is connected to a motor ECU 5. In addition, the motor ECU 5 transmits and receives signals to and from the engine ECU 7. The motor ECU 5 and the engine ECU 7 constitute a control portion of the control apparatus for an internal combustion engine according to the invention.

In a vehicle provided with the engine 1, when driving force is not required, for example, when the vehicle stops for a short time, the engine 1 is automatically stopped. Then, the engine 1 is cranked by the motor generator 4 so as to be restarted at the time of take-off. In the vehicle, control for reducing a workload in the compression stroke is performed during a period from when the engine is restarted until when a predetermined crank angle position is reached. For example, the engine ECU 7, which is a compression workload reducing portion, opens an intake valve 13 or an exhaust valve 14 for a certain period during the compression stroke, or throughout compression stroke, thereby performing the control for reducing the workload. Whether or not the predetermined crank angle position is reached is determined based on the output of the crank angle sensor 21. However, the detection can be performed with higher accuracy by using the output of the motor angle sensor 41 provided on the motor shaft of the motor generator 4.

Figure 2:
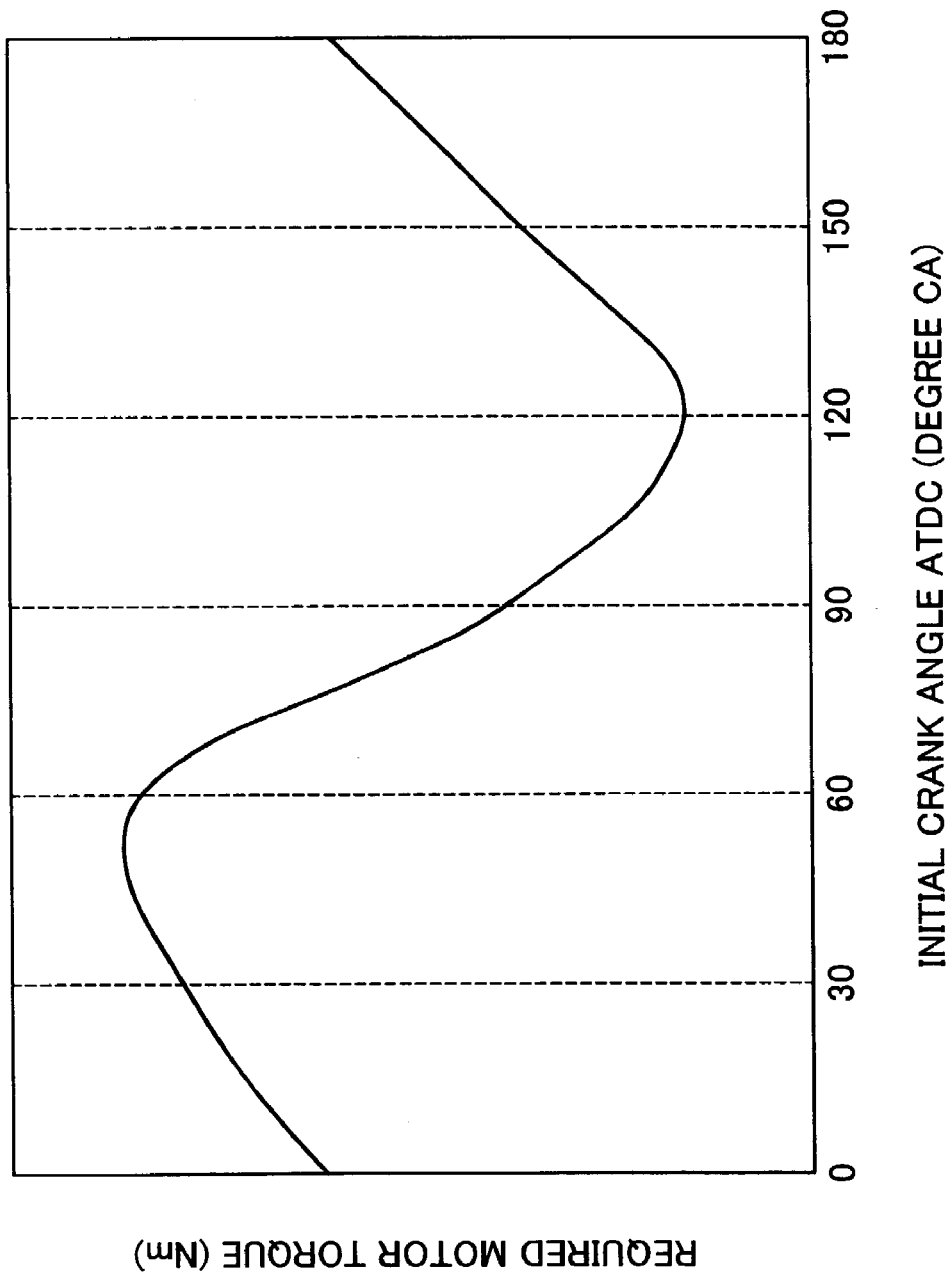
FIG. 2 is a graph showing a change in required cranking torque with respect to an initial crank angle position.
Figure 3:
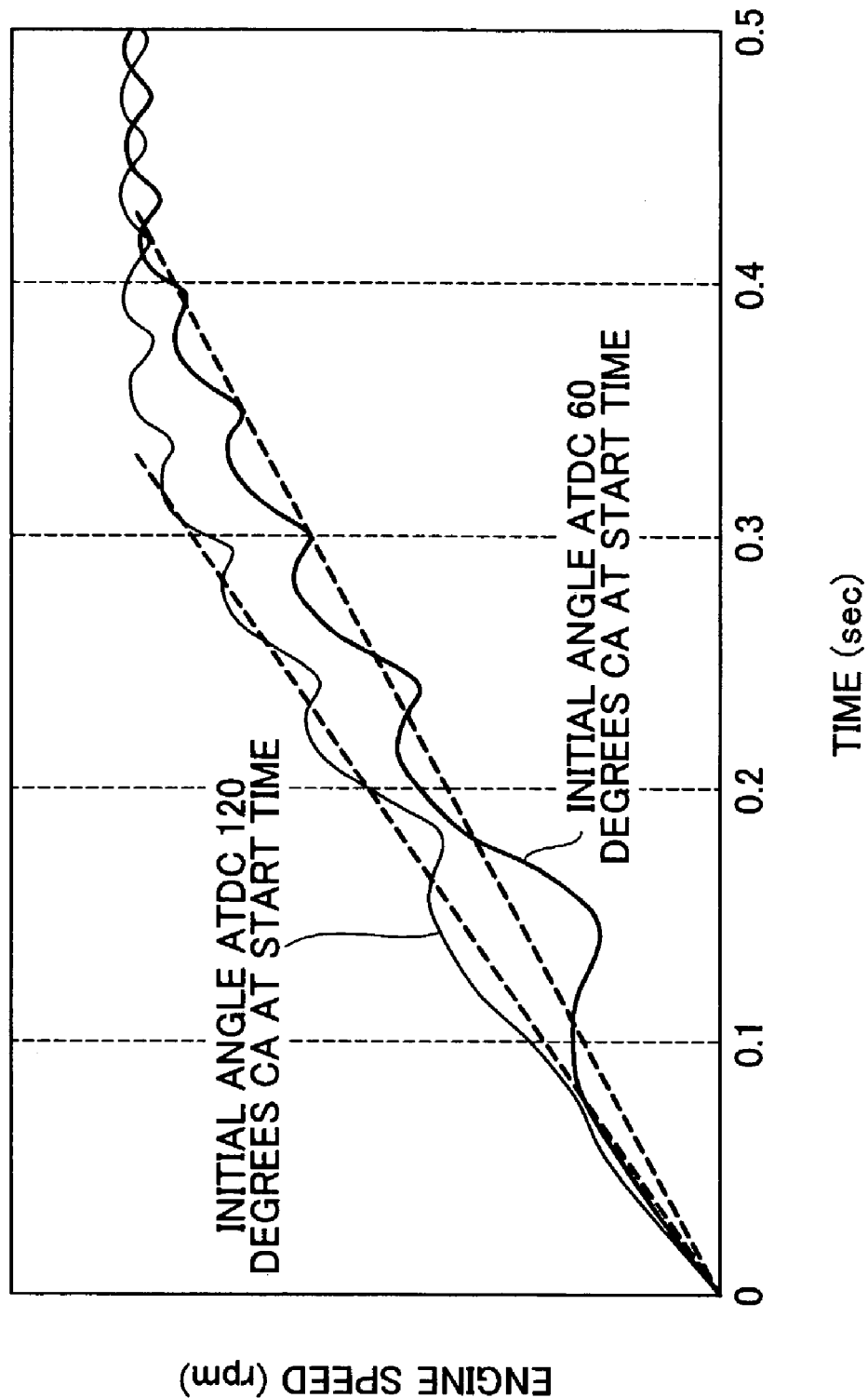
FIG. 3 is a graph showing changes in engine speed at the engine start time in the case of different initial crank angle positions.

Torque (cranking torque) which is required for the motor generator 4 to rotate the crank shaft 2 varies depending on the angle position of the crank shaft 2 at the start time, that is, a stop angle position of the crank shaft 2 at which the crank shaft 2 has been stopped. The cranking torque varies also depending on the number of the cylinders of the engine 1 and the opening/closing timing of the intake valve 13 and the exhaust valve 14. FIG. 2 is a graph showing a change in required cranking torque with respect to an initial crank angle position in the case of a four-cylinder engine. FIG. 3 is a graph showing changes in engine speed at the engine start time in the case of different initial crank angle positions.

In the case of a four-cylinder engine, the required cranking torque changes every 180 degrees from an ATDC position. The required cranking torque is the maximum value at approximately 50 degrees, and is the minimum value at approximately 120 degrees. In the case where the engine is started at the initial angles of ATDC 120 degrees CA and ATDC 60 degrees CA using the same cranking means, the engine speed reaches the idling engine speed more quickly and a fluctuation in the engine speed during a period until the idling engine speed is reached is smaller when the initial angle is 120 degrees and the required cranking torque is small, than when the initial angle is 60 degrees, as shown in FIG. 3.

Figure 4A:
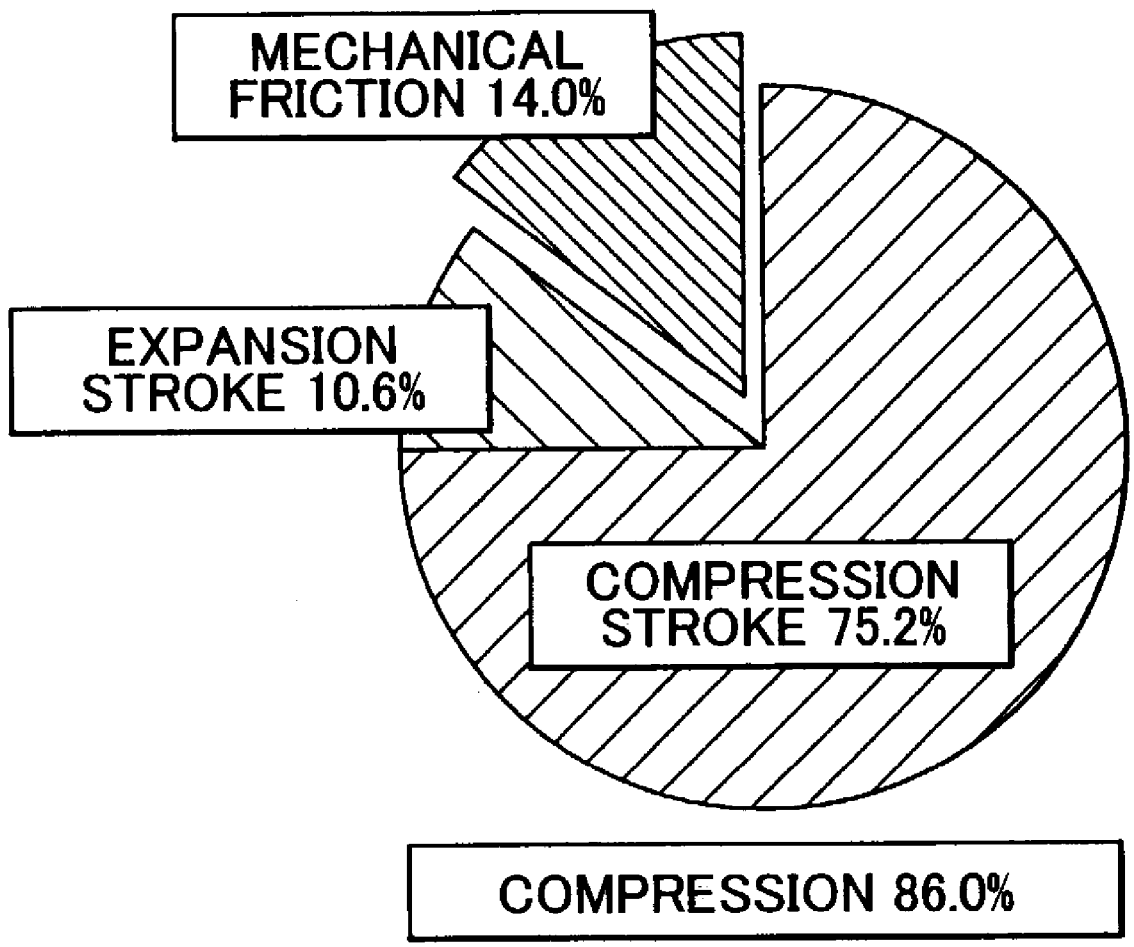
FIG. 4A and FIG. 4B are circle graphs each of which shows a breakdown of energy required for starting the engine when control for reducing a compression workload is not performed.
Figure 4B:
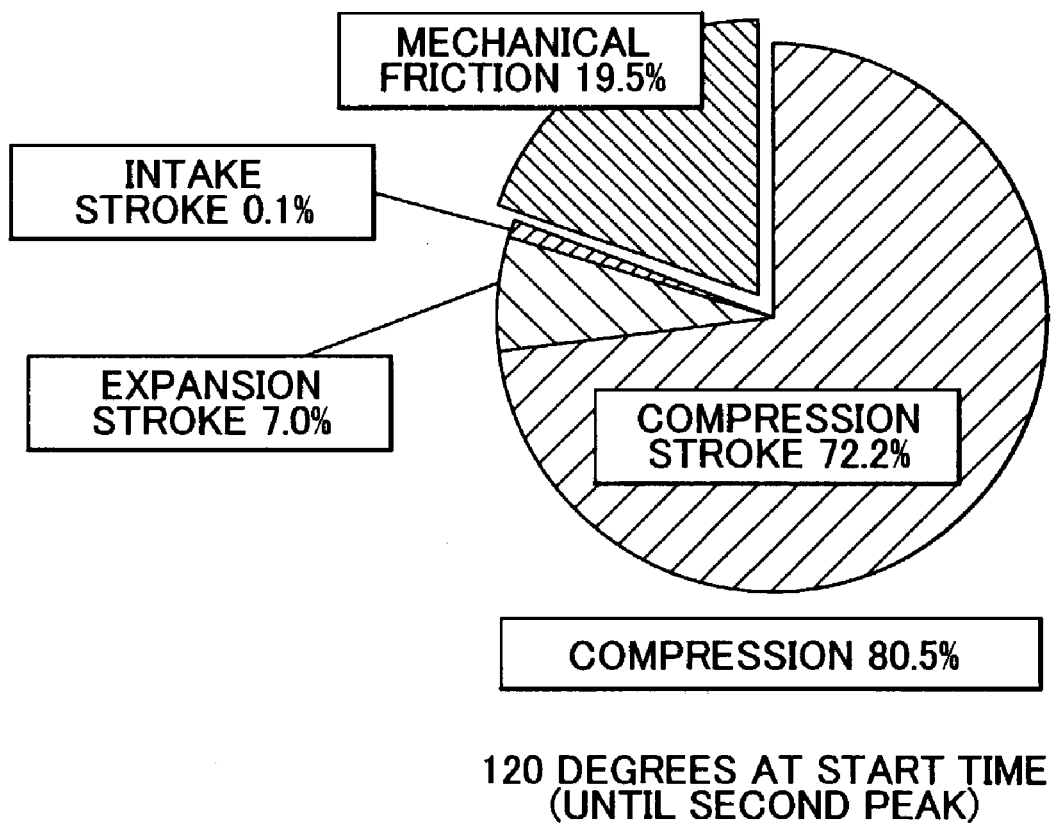

FIG. 4A and FIG. 4B are circle graphs each of which shows a breakdown of energy required for starting the engine when control for reducing a compression workload is not performed. FIG. 4A shows the breakdown of the required energy until the first peak in the graph in FIG. 3 when the initial angle is 60 degrees CA. FIG. 4B shows the breakdown of the required energy until the second peak in the graph in FIG. 3 when the initial angle is 120 degrees CA. These peaks correspond to the peaks in the fluctuation in the engine speed in FIG. 3. As apparent from these two graphs, most of the energy is used for work of compressing and expanding air in the cylinder 10. The compression work during the compression stroke occupies three-fourths of the total work.

Figure 5:
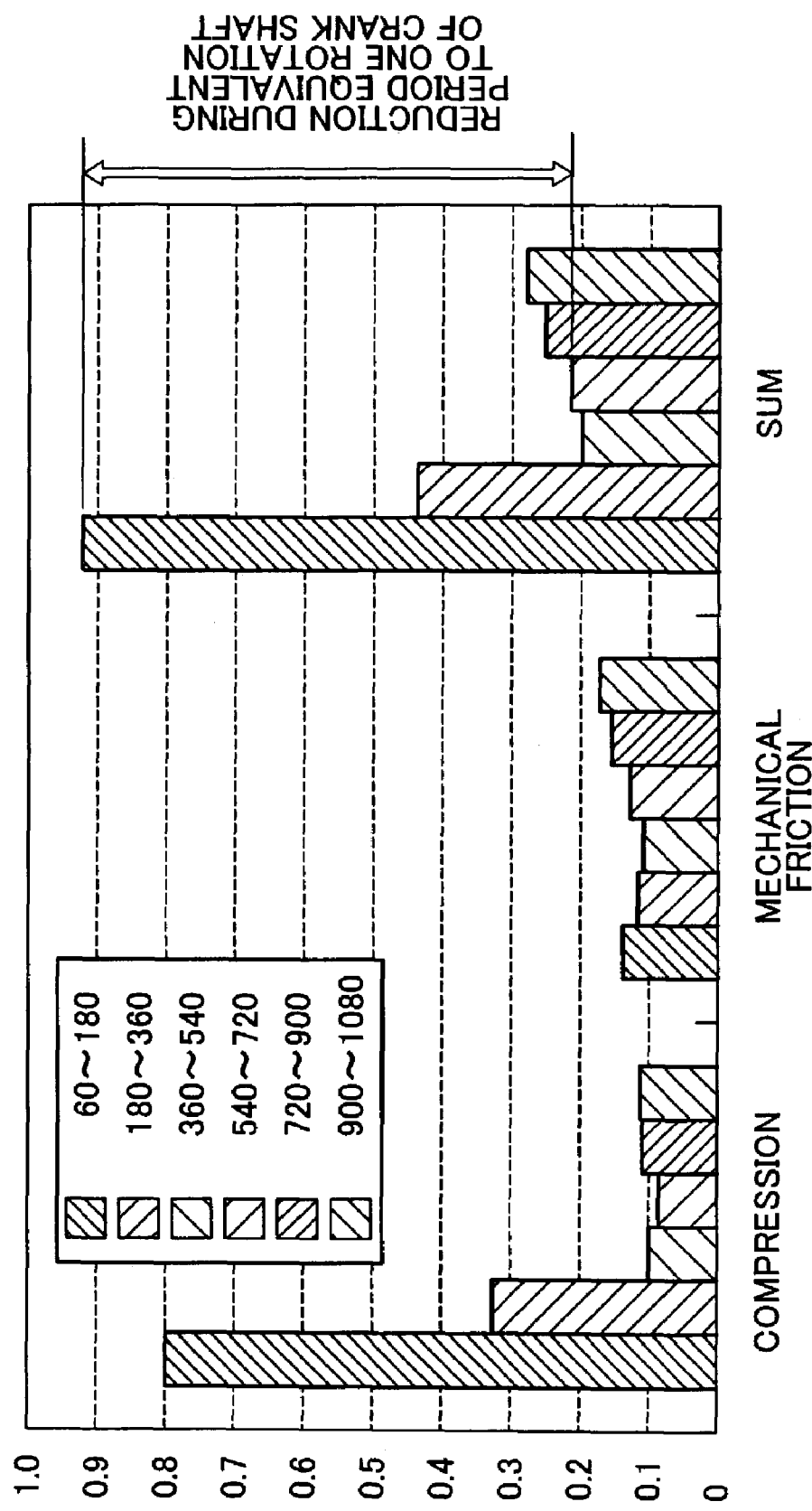
FIG. 5 is a bar graph showing changes in compression energy, mechanical friction, and a sum of the compression energy and the mechanical friction with respect to the crank angle position.

FIG. 5 is a bar graph showing changes in energy for compression (including not only compression but also expansion, intake of air, and exhaust of air), mechanical friction energy which is consumed by friction, and the sum of the compression energy and the mechanical friction energy with respect to the crank angle position, when the initial angle is 60 degrees CA. The change in the mechanical friction energy is small. Meanwhile, the compression energy is extremely large during the first rotation, especially during the initial one-third of the rotation, as compared with the compression energy during the subsequent rotations. This is due to the following reason. In some cylinders, intake of air is not performed first during the first rotation, and instead, compression, expansion (combustion), or exhaust of air is performed first during the first rotation. In addition, combustion has not been started unlike during the normal operating time. Therefore, such cylinders serve simply as air pumps, and useless work which does not contribute to the output of the engine is performed during the first rotation.

Figure 6:
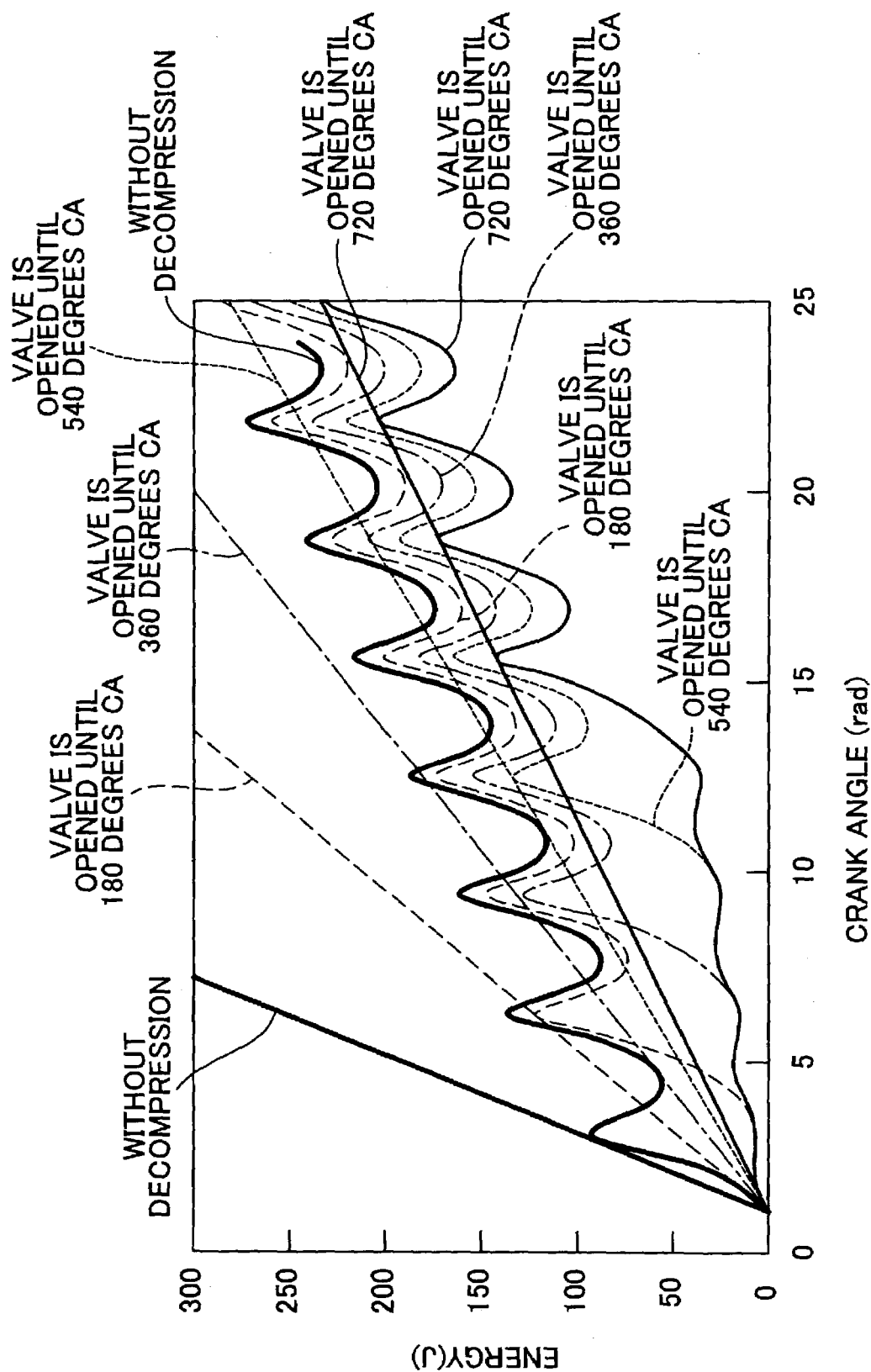
FIG. 6 is a graph showing changes in energy with respect to the crank angle due to periods in which an intake valve 13 is opened.
Figure 7:
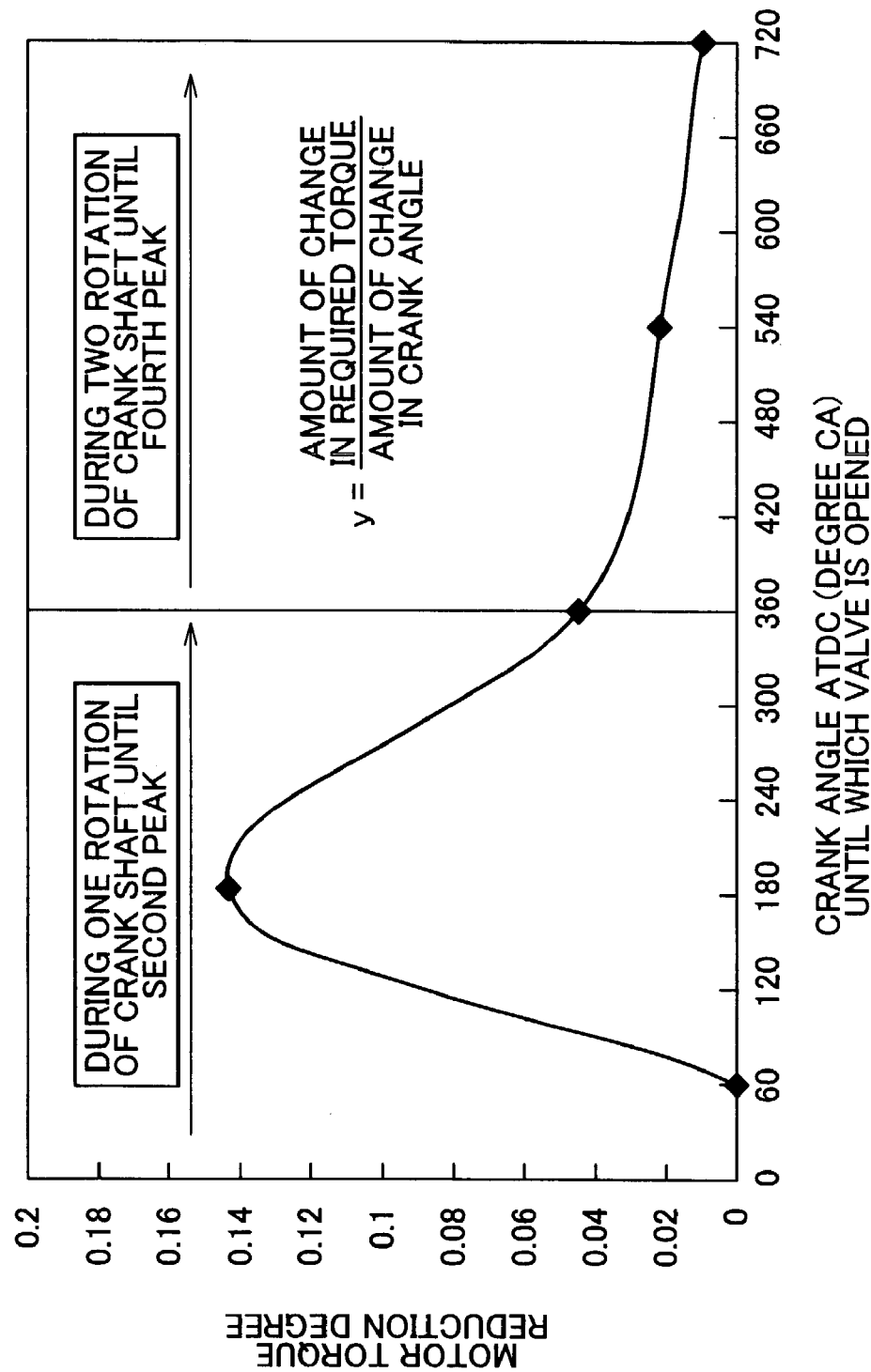
FIG. 7 is a graph showing an effect of reducing the required cranking torque with respect to the period in which the intake valve 13 is opened.

Therefore, in the embodiment of the invention, the cranking torque required for starting the internal combustion engine is suppressed by performing the control for reducing the workload in the compression stroke during a period from when cranking is started until when the crank angle reaches a predetermined crank angle position. FIG. 6 is a graph showing changes in energy with respect to the crank angle due to periods in which an intake valve 13 is opened. As the period in which the intake valve 13 is opened from the initial start time is longer, the first peak of the energy appears later, that is, at a larger crank angle position. The required crank torque is defined as an inclination of a line tangent to the energy curve. Therefore, basically, as the first peak appears later and the height of the peak is smaller, the required cranking torque is smaller. In other words, the period in which the intake valve 13 is opened is longer, the required cranking torque is smaller. However, if the period in which the intake valve 13 is opened is made longer, a period until when the engine is started becomes longer.

Meanwhile, with regard to a change in the required cranking torque with respect to the period in which the intake valve 13 is opened, an effect of reducing the required cranking torque due to the period in which the intake valve 13 is opened is large during the first compression stroke after the engine start, and subsequently decreases. Therefore, it is sufficient to set the period in which the intake valve 13 is opened to a period until the first ATDC (360 degrees) or a period until the second ATDC (720 degrees) at the longest. It is possible to perform initial explosion in a condition where the engine speed is increased quickly after the engine start by setting the period in which the intake valve 13 is opened to a period equivalent to approximately two rotations of the crank shaft 2 at the longest. Accordingly, the output can be increased quickly, thereby improving the startability of the internal combustion engine.

Figure 8:
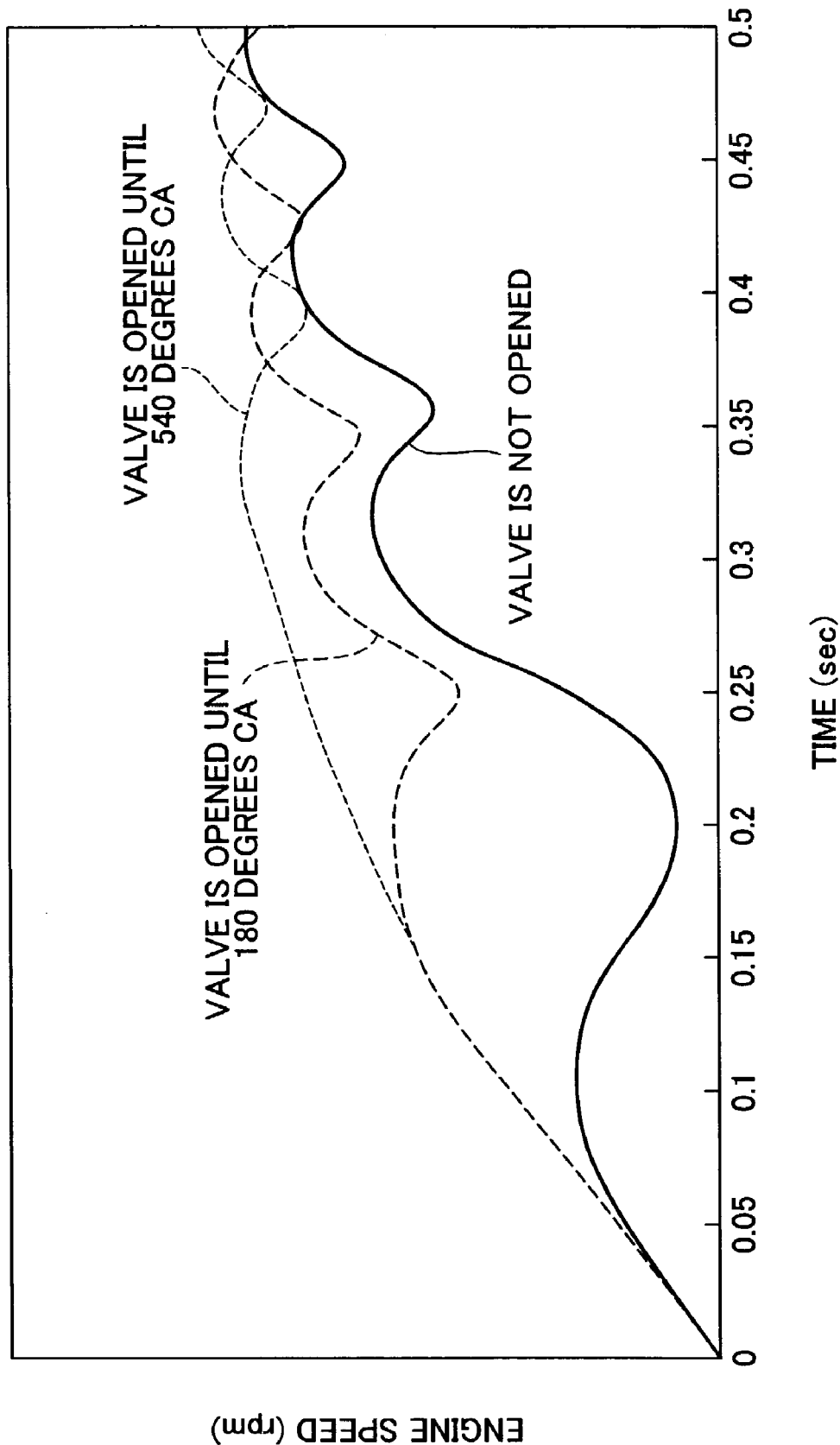
FIG. 8 is a graph showing, in a comparative manner, changes in the engine speed at the initial start time in the cases where the intake valve 13 is opened and in the case where the intake valve 13 is not opened.

FIG. 8 is a graph showing changes in the engine speed at the initial start time in the case where the intake valve 13 is not opened, in the case where the intake valve 13 is opened until 180 degrees CA, and in the case where the intake valve 13 is opened until 540 degrees CA in the embodiment. The engine is started at 0 degree CA. As the period in which the intake valve 13 is opened is longer, the required cranking torque is smaller, the engine speed increases more quickly, and the engine is started more smoothly. However, when the operation of the intake valve 13 is changed to the normal operation, the fluctuation in the engine speed becomes large. Thus, it is not appropriate to set the period in which the intake valve 13 is opened to a unnecessarily long period.

Figure 9:
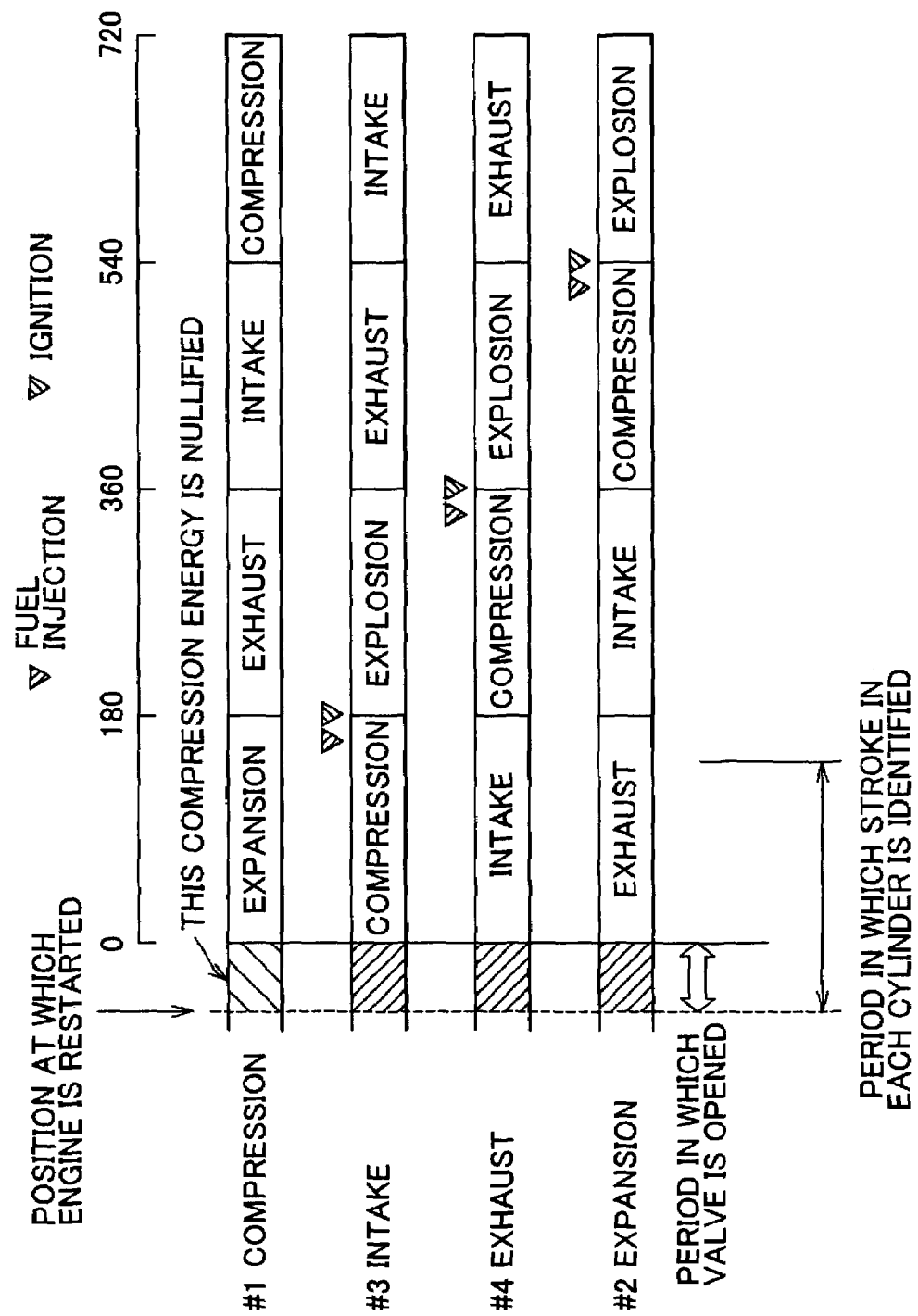
FIG. 9 is a diagram showing strokes when an engine 1 according to the invention is started.

FIG. 9 is a diagram showing strokes when an engine 1 according to the invention is started. The engine 1 is of a type in which fuel is directly injected into the cylinder. A sharp sign signifies a cylinder number. In FIG. 9, a case where a stop crank angle position is ATDC −180 degrees to 0 degree is shown as an example. The compression energy is nullified from the start of the cranking until the crank angle position of ATDC 0 degree, by opening the intake valve 13 using the valve control mechanism 18. Then, the control of the intake valve 13 is changed to the normal control at ATDC 0 degree. Subsequently, fuel is injected into each cylinder 10 by the fuel injector 16, and ignition is performed by the ignition plug 15 at a late stage of the compression stroke, whereby combustion is started. Thus, it is possible to perform the initial explosion at approximately a half rotation of the crank shaft 2 after start of the engine, thereby improving the startability. Further, since the cranking torque is reduced, the motor generator 14 is made small, and the electric power for the motor ECU 5 is reduced. Accordingly, the wire from the power source 6 can be made thinner, the cost of the engine 1 can be reduced, and the energy required for rotating the engine 1 can be reduced.

Figure 10:
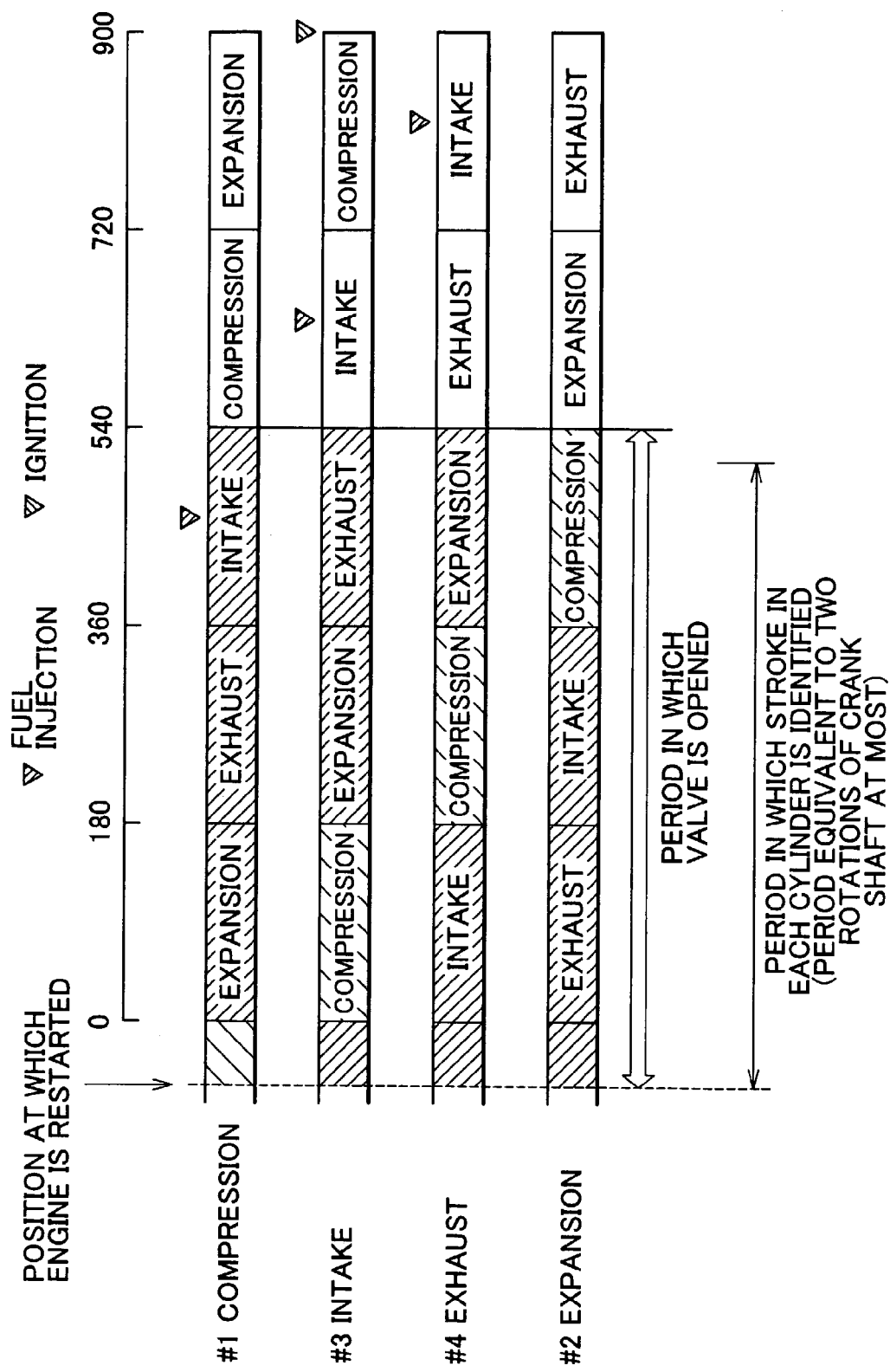
FIG. 10 is a diagram showing strokes at the engine start time when the invention is applied to an intake port injection type engine.

When an engine in which fuel is injected into an intake port is employed, instead of the engine 1 of the type in which fuel is directly injected to the cylinder, it is preferable to set the period in which the intake valve 13 is opened to a longer period than when the direct injection type engine is employed. FIG. 10 is a diagram showing strokes at the start time when the invention is applied to such an intake port injection type engine. A case where a stop crank angle position is ATDC −180 degrees to 0 degree is shown as an example in FIG. 10, as in FIG. 9. The compression energy is nullified from the start of the cranking until the crank angle position of ATDC 540 degrees, by opening the intake valve 13 using the valve mechanism 18. The control of the intake valve 13 is changed to the normal control at ATDC 540 degrees. Fuel is injected into the intake port connected to the appropriate cylinder during the intake stroke from ATDC 360 degrees, whereby an air-fuel mixture is introduced into the cylinder. Then, ignition is performed by the ignition plug 15 at the late stage of the compression stroke, whereby combustion is started. Thus, it is possible to perform the initial explosion at approximately two rotations of the crank shaft 2 after start of the engine, thereby improving the startability. In addition, the same effects as those of the operation strokes in FIG. 9 can be obtained.

In the aforementioned embodiments, the intake valve is opened until a specific absolute crank angle position. However, the crank angle position at the start of the cranking may change. Accordingly, the intake valve may be opened until a relative crank angle position with respect to the crank angle position at the start of the cranking reaches a specific relative crank angle position. Alternatively, the absolute crank angle position at which the opened intake valve is closed may be changed depending on the crank angle position at the start of the cranking. The crank angle positions in both of these cases are included in the concept of "a predetermined crank angle position" according to the invention.

It is preferable that the predetermined crank angle position should be a crank angle position at which the first compression strokes in all cylinders are completed. The predetermined crank angle position needs to be at least a crank angle position at which the first compression stroke is completed in a cylinder in which the compression stroke is performed first after start of the cranking.

Figure 11:
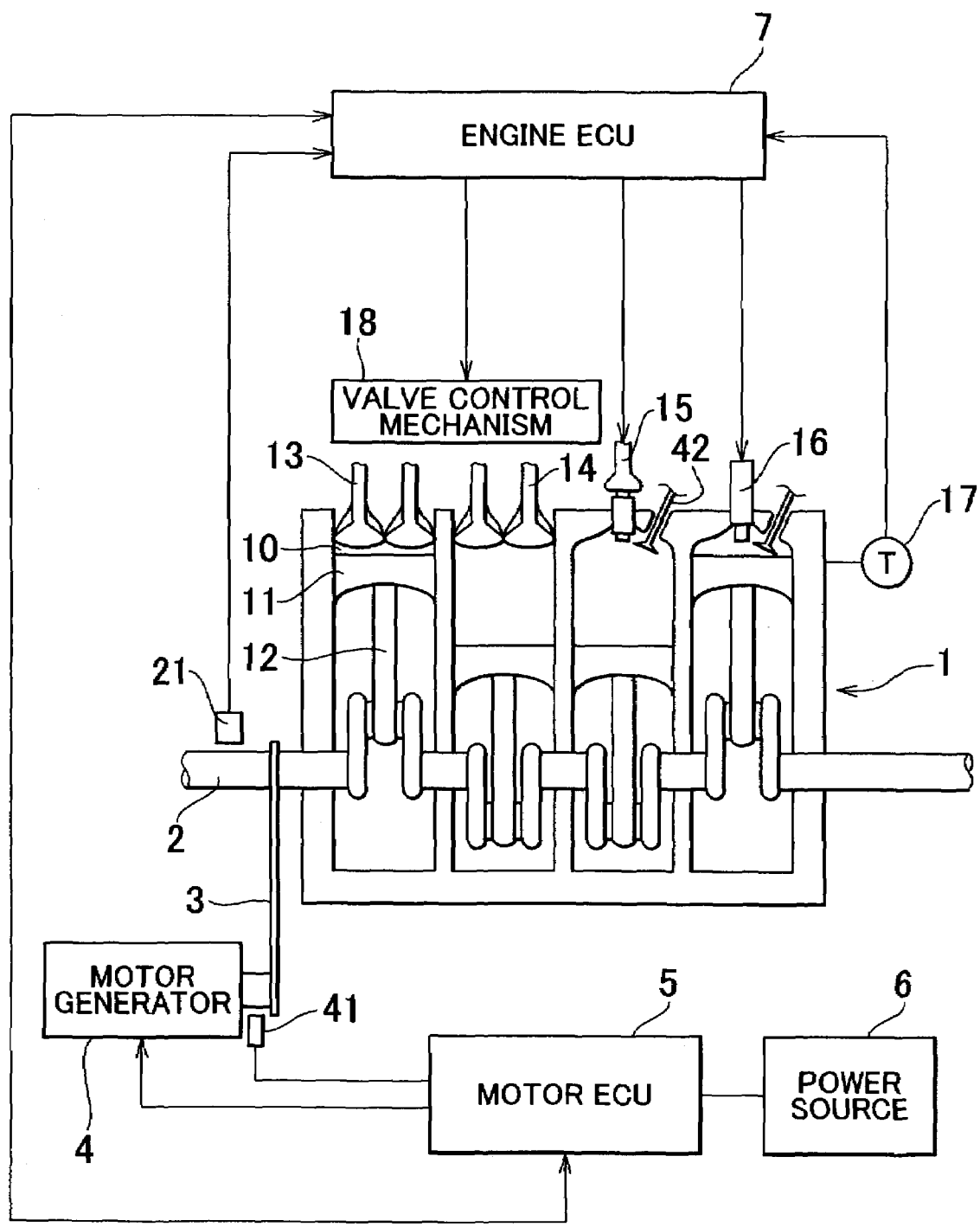
FIG. 11 is a schematic diagram showing a configuration of an internal combustion engine provided with a communicating valve 42.

A configuration in which the intake valve 13 is opened until a predetermined crank angle position has been described so far. However, the intake valve 13 may be opened for a certain period during the compression stroke, or the exhaust valve 14 may be opened instead of the intake valve 13. Naturally, the opening operations of both the intake valve 13 and the exhaust valve 14 may be combined. The intake valve 13 may be opened during the compression stroke by closing the intake valve 13 after an intake BDC (i.e., an intake bottom dead center). Further, as shown in FIG. 11, a communicating valve 42 which switches between establishment and interruption of communication between an inside and an outside of the cylinder 10 may be provided besides the intake valve 13 and the exhaust valve 14, and may be opened at least for a certain period during the compression stroke so that communication can be established between the inside and the outside of the cylinder 10, thereby reducing the compression workload.

Further, when the engine 1 is stopped using the motor ECU 5 as a stop position control portion, electric current is supplied to the motor generator 4, and the crank shaft 2 is stopped at a desired angle position (preferably, at ATDC 0 degree) with reference to the outputs of the motor angle sensor 41 and the crank angle sensor 21. Since the engine speed at the time of initial explosion can be maintained at constant and high speed, variations in the restart time are reduced, startability when the engine is started next time is improved, time until the initial explosion is maintained at a substantially constant level, and a feeling at the engine start time is improved. In this case, the same control effect can be obtained whether the control using the aforementioned absolute crank angle position is performed or the control using the relative crank angle position is performed. The invention is suitable especially in a hybrid vehicle or an economical running vehicle in which the engine 1 is repeatedly stopped and started with frequency.

As described above, in the control apparatus for an internal combustion engine according to the embodiment of the invention, the required cranking torque is reduced by reducing the compression workload at the initial stage of cranking. Accordingly, the fluctuation in the engine speed can be reduced, and vibration can be reduced, thereby improving the startability. Also, it is possible to secure the compression ratio and to obtain the high output of the engine, by returning the compression workload to a normal level after a predetermined crank angle position is reached. The predetermined crank angle position is not limited to a specific absolute angle position. The concept of the predetermined crank angle includes a relative angle position, that is, a position at which an amount of change in the crank angle from the start of the cranking reaches a predetermined amount of change. Thus, the output of the engine can be increased quickly when the engine is started in the case where the high output of the engine is required. Further, the cranking portion can be made small, and the energy required for rotating the engine can be reduced.

Also, the cranking torque at the engine start time can be reduced to a large extent by reducing the compression workload during the first compression stroke, especially during the first compression stroke in a cylinder in which the compression stroke is performed first after start of the cranking. Therefore, the startability can be improved.

It is preferable that the compression workload reducing portion as a compression workload reducing means should be means for controlling the opening timing of the intake valve or the exhaust valve. The intake valve or the exhaust valve is opened at least for a certain period during the compression stroke by controlling the opening and closing timing of the intake valve or the exhaust valve, whereby the compression friction energy can be reduced, and the initial cranking torque can be reduced to a large extent.

As described above, according to the invention, the compression workload is reduced during a period from when the cranking is started until when a predetermined crank angle position is reached, whereby the fluctuation in the engine speed can be suppressed, the startability of the engine can be improved, and the output of the engine can be increased quickly.

What is claimed is:

1. A control apparatus for an internal combustion engine, comprising:
    a cranking portion which performs cranking of the internal combustion engine at a start time of the engine;
    a crank angle sensor which detects a crank angle position; and
    a compression workload reducing portion which operates so as to reduce a compression workload of the engine during a period from when cranking is started until when a predetermined crank angle position is reached.

2. The control apparatus according to claim 1, wherein the predetermined crank angle position is a crank angle position at which first compression strokes in all cylinders are completed.

3. The control apparatus according to claim 1, wherein the predetermined crank angle position is a crank angle position at which a first compression stroke is completed in a cylinder in which a compression stroke is performed first after start of the cranking.

4. The control apparatus according to claim 1, wherein the compression workload reducing portion controls opening timing of one of an intake valve and an exhaust valve.

5. The control apparatus according to claim 4, wherein the compression workload is reduced by opening the intake valve of the internal combustion engine.

6. The control apparatus according to claim 4, wherein the compression workload is reduced by opening the exhaust valve of the internal combustion engine.

7. The control apparatus according to claim 1, further comprising:
    a communicating valve which establishes communication between an inside and an outside of a cylinder of the internal combustion engine, wherein the compression workload is reduced by opening the communicating valve.

8. The control apparatus according to claim 1, further comprising:
    a stop position control portion which controls a crank angle position at a stop time of the engine to a predetermined angle position.

9. The control apparatus according to claim 1, wherein the period in which the compression workload is reduced is at most equal to or shorter than a period equivalent to one rotation of a crank shaft after start of the internal combustion engine when the internal combustion engine is a direct injection type engine.

10. The control apparatus according to claim 1, wherein the period in which the compression workload is reduced is at most equal to or shorter than a period equivalent to two rotations of a crank shaft after start of the internal combustion engine when the internal combustion engine is an intake port injection type engine.

11. A control method of a control apparatus for an internal combustion engine, comprising:
    a step of starting cranking;
    a step of detecting a crank angle position; and
    a step of reducing a compression workload of the engine during a period from when the cranking is started until when a predetermined crank angle position is reached.

12. The control method according to claim 11, wherein the predetermined crank angle position is a crank angle position at which first compression strokes in all cylinders are completed.

13. The control method according to claim 11, wherein the predetermined crank angle position is a crank angle position at which a first compression stroke is completed in a cylinder in which a compression stroke is performed first after the cranking is started.

14. The control method according to claim 11, wherein the compression workload is reduced by controlling opening timing of one of an intake valve and an exhaust valve.

15. The control method according to claim 14, wherein the compression workload is reduced by opening the intake valve of the internal combustion engine.

16. The control method according to claim 14, wherein the compression workload is reduced by opening the exhaust valve of the internal combustion engine.

17. The control method according to claim 11, the compression workload is reduced by opening the communicating valve which establishes communication between an inside and an outside of a cylinder of the internal combustion engine, wherein.

18. The control method according to claim 11, further comprising:
    a step of controlling a crank angle position at a stop time of the engine to a predetermined angle position.

19. The control method according to claim 11, wherein a period in which the compression workload is reduced is at most equal to or shorter than a period equivalent to one rotation of a crank shaft after start of the internal combustion engine when the internal combustion engine is a direct injection type engine.

20. The control method according to claim 11, wherein a period in which the compression workload is reduced is at most equal to or shorter than a period equivalent to two rotations of a crank shaft after start of the internal combustion engine when the internal combustion engine is an intake port injection type engine.

* * * * *